455-612 AU 233 EX

FIP8106 XR 3,803,405

T370-4 X5009R X370-85 X370-92

United States Patent [19]

Ohnsorge et al.

[11] 3,803,405

[45] Apr. 9, 1974

[54] DATA TRANSMISSION SYSTEM

[75] Inventors: Horst Ohnsorge, Erstetten; Mandred Borner, Ulm/Danube, both of Germany

[73] Assignee: Telefunken Patentverwertungsgesellschaft m.b.H., Ulm, Germany

[22] Filed: Jan. 24, 1972

[21] Appl. No.: 220,009

Related U.S. Application Data

[63] Continuation-in-part of Ser. No. 865,062, Oct. 8, 1969, abandoned.

[30] Foreign Application Priority Data

Oct. 9, 1968 Germany 1801999
Oct. 31, 1968 Germany 1806251

[52] U.S. Cl. 250/199, 179/15 AL

[58] Field of Search 179/15 BA, 15 AL, 15 AT; 178/DIG. 2; 250/199

[56] References Cited

UNITED STATES PATENTS

| | | | |
|---|---|---|---|
| 2,683,771 | 7/1954 | Ridlington | 179/15 AT |
| 2,187,908 | 1/1940 | McCreary | 178/DIG. 2 |
| 2,541,348 | 2/1951 | Espenschied | 179/15 AL |
| 3,267,932 | 8/1966 | Valliere | 178/DIG. 2 |
| 3,401,469 | 9/1968 | Shaver | 250/199 |
| 3,456,242 | 7/1969 | Lubkin | 179/15 AL |

Primary Examiner—Ralph D. Blakeslee
Attorney, Agent, or Firm—Spencer & Kaye

[57] ABSTRACT

A telephone network in which circuits at each user location monitor the entire data flow in which the individual messages are multiplexed and selects the message directed to that location on the basis of identifying data also transmitted as part of the data flow.

15 Claims, 13 Drawing Figures

*Inventors.*
Horst Ohnsorge
Manfred Börner

BY Spencer & Kaye
ATTORNEYS.

Inventors.
Horst Ohnsorge
Manfred Börner
BY Spencer & Kaye
ATTORNEYS.

INVENTORS.
Horst Ohnsorge
Manfred Börner

BY Spencer & Kaye

ATTORNEYS.

OWN ADDRESS-RECOGNITION

GAP-RECOGNITION

IS WRITTEN AT THE BEGINNING

PULSE-SEQUENCE I- GENERATOR

PULSE-SEQUENCE I-INDICATOR

ADDRESS - GENERATOR

SWITCH S5

DATA TRANSMISSION SYSTEM

CROSS-REFERENCE TO RELATED APPLICATION

This application is a continuation-in-part of U.S. Application Ser. No. 865,062 filed Oct. 8, 1969 now abandoned and entitled DATA TRANSMISSION SYSTEM.

BACKGROUND OF THE INVENTION

The present invention relates to a data transmission system provided with broadband transmission channels for a plurality of user locations. The user locations exchange separate messages which are combined in a transmission channel according to the time multiplex, frequency multiplex or time function multiplex methods and are provided with identifying indicia which permit them to be distinguished from one another and to be delivered to the proper individual user locations.

In the telephone communications art it is the custom to associate narrowband channels with the user locations for the exchange of information in such a manner that a central office makes a channel available for each pair of communicating user locations. This requires a considerable amount of switchboard equipment and the like to establish these connections. Moreover, a large number of narrowband channels must be available, with a certain excess number having to be held in reserve, which is economically undesirable.

Data transmission systems have become known, for example from the satellite art, in which very broadband transmission media are employed or which employ carrier frequency systems as well as waveguide arrangements. In all these systems, the messages which are to be transmitted are first collected and prepared for transmission over the broadband path. This preparation consists in that, for example according to the known methods of frequency multiplexing, time multiplexing or time function multiplexing, each user location is allocated a narrow frequency band, or a different time interval within each time frame of the total transmission, or a certain time function. The messages which are "boxed" in this manner are then transmitted, separated again at the receiving end by a central receiving station, and then delivered to the individual user locations. This also requires central exchange installations which entail considerable expenditures.

SUMMARY OF THE INVENTION

It is a primary object of the present invention to overcome these drawbacks and difficulties.

Another object of the invention is to reduce the cost of telephone systems.

A further object of the present invention is to provide a telephone system which does not need a central office and which is free of interference to a large extent.

These and other objects according to the invention are achieved in a data transmission system composed of a plurality of user locations connected to a common transmission medium for transmitting messages, including address data through such medium, and multiplex means for multiplexing the individual messages for delivery to the transmission medium, by the improvement comprising means associated with each location for monitoring the entire data flow through the medium and automatically selecting that data intended for the location.

DESCRIPTION OF THE PREFERRED EMBODIMENTS

Figure 1:
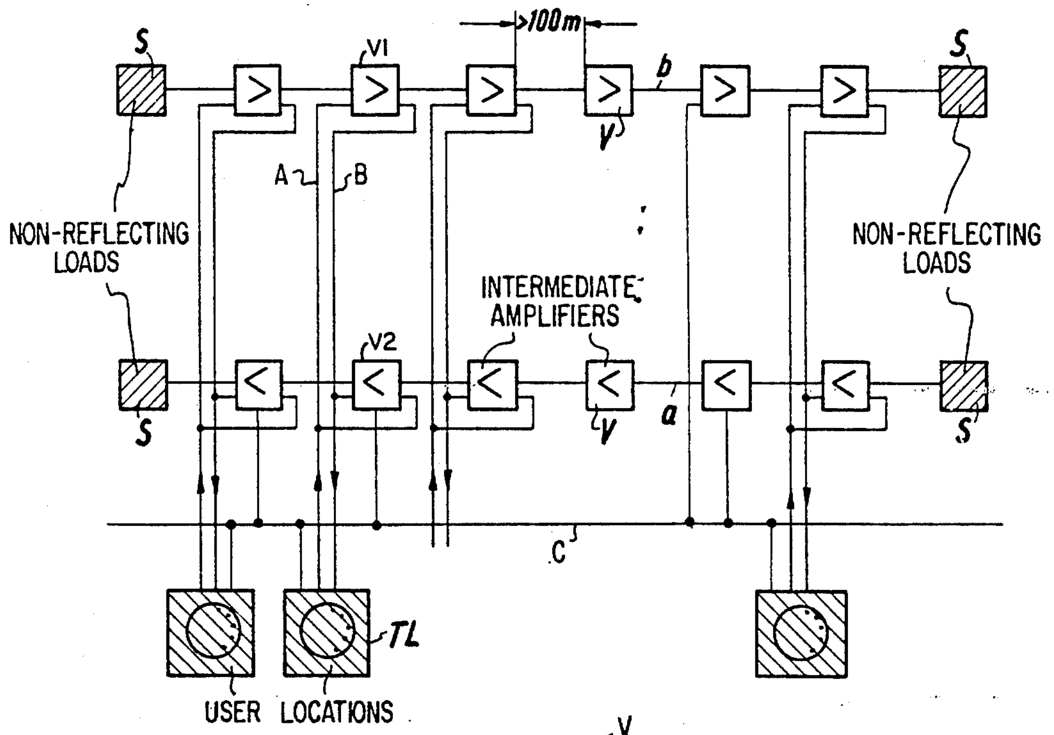
FIG. 1 is a schematic block diagram of one embodiment of the invention.

FIG. 1 shows one embodiment of the telephone system according to the present invention in the form of a two-channel, one-way arrangement. The two channels a and b are preferably connected at both ends to non-reflecting loads, or sinks, S. In the path of each channel there are connected intermediate amplifiers V. Each user location TL has an outgoing line and an incoming line both connected to two such intermediate amplifiers V to receive from both directions and to transmit in both directions.

If the system were of the frequency division multiplexing type, each user location is allocated a particular frequency band for data transmission and is arranged to also transmit an address signal identifying the user location to which data is to be transmitted. For reception, each user location is provided with apparatus for monitoring all data being transmitted and to automatically tune to any frequency band in which its address signal is being transmitted.

When the system is arranged as a time multiplex system it is possible, using ordinary techniques, to provide a time frame which is binding upon all users, in which a central synchronization signal emitter delivers synchronization signals of constant interval. Within the time frame thereby determined it would in theory be possible to allocate fixed time intervals to each user location, but this would have the disadvantage that under some circumstances a large number of time intervals would not be utilized, since every telephone network is not constantly fully busy. It is therefore more advantageous that each user location should automatically seek out free time intervals and occupy them for the conversation which it is to transmit. In a further development of the invention, the centrally determined time frame may even be eliminated and every user location may seek out free time intervals for itself within a completely asynchronous flow of data.

One embodiment which makes use of this further development will be explained below, and more precise information will be given regarding the circuit assembly of the user locations.

The form of sinks S depends upon the actual form of the transmission medium. If, for example, the transmission medium is a bunch of glass fibers which transmits modulated light beams, then each sink S will expediently be formed as a cavity having low-reflection walls, preferably black walls, so that no reflections can take place back into the light-conductor. Where a coaxial conductor is used this will be closed off with a termination simulating the characteristic impedance of the coaxial conductor. Such a termination, as is known, is free from reflection. If a waveguide is used, this will be closed off with a suitably closed-off circulator.

Figure 2:
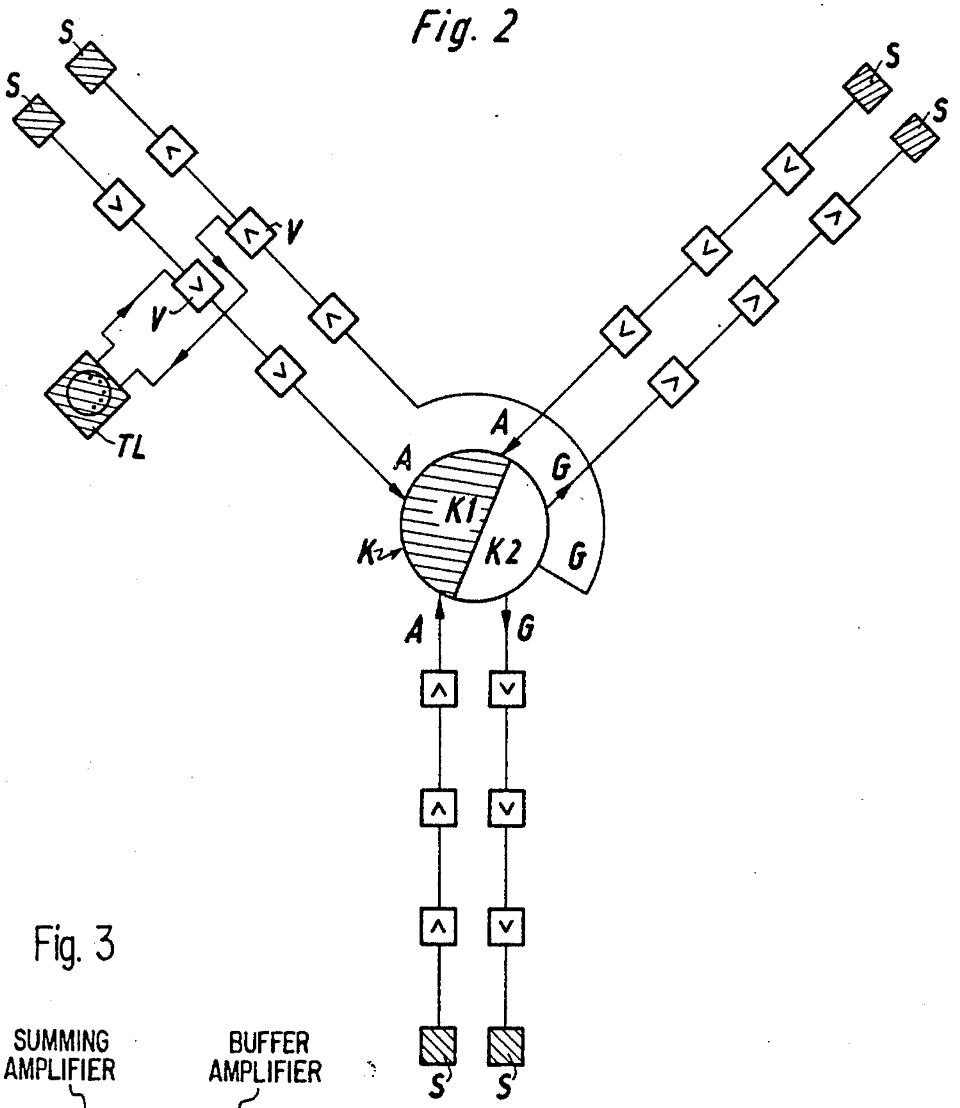
FIG. 2 is a view similar to that of FIG. 1 of another embodiment of the invention.

FIG. 2 shows a telephone system according to the present invention in the form of a star network. Here, too, each branch includes two individual lines provided with intermediate amplifiers V and terminated by reflection-free sinks S, each user location TL being connected to two intermediate amplifers. Each one-way channel, however, is only terminated at one side by the sinks S; on the other side they end in a coupling point K. The coupling point consists of a device K1 which collects all incoming messages at points A and transfers them to a device K2 which then transmits the collected messages in all outgoing directions G.

Figure 3:
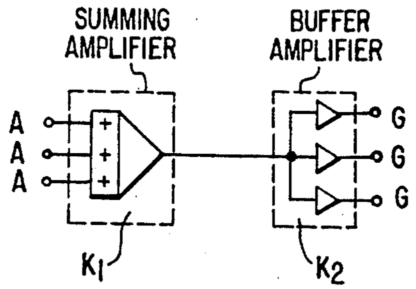
FIG. 3 is a schematic block diagram of the circuit of the coupling point shown in FIG. 2.

The devices K1 and K2 can, for example, be arranged as illustrated in FIG. 3. The device K1 is a summing amplifier which is connected with the incoming lines of the corresponding branches. The output value of the summing amplifier, device K1, is delivered, through a parallel connection of buffer amplifiers which form the device K2, to the outgoing pairs of lines.

In the example, the assembly of the devices K1 and K2 is simple because it is assumed that the time allocation in the framework of the time multiplex system is the same, throughout the entire network, that is to say does not differ from branch to branch. This assumption can be made because the capacity of such network is extremely high, so that, without limitation on the use, an allocation can be selected which is uniform for the entire network. For the case where the system is composed of optical fibers in which modulated light beams are transmitted, opto-electrical converters, such as will be described further below in connection with the construction of the amplifiers, are inserted before the device K1 and after the device K2.

Here, too, each user location has at its disposal at all times the entire contents of the information transmitted through the system. In a further embodiment of the present invention, it is possible to provide further coupling points K in place of the sinks S, and thus to further enlarge the network.

Carrier frequency systems and waveguide arrangements have already been mentioned as the transmission media which exhibit the required broadband behaviour. Both, however, are expensive and cumbersome, particularly in a system serving a multitude of private user locations. For example, it can hardly be imagined to install waveguides in homes as telephone connections. It is proposed, therefore, as mentioned previously to use optical fibers as the transmission media. These are relatively thin and sufficiently flexible even with regard to a reduction in the interference which can arise from bending, so that the above-mentioned drawbacks during installation are eliminated. The required conversion of the information to be transmitted into an appropriate modulated light beam is possible relatively easily in accordance with the known techniques of the laser art.

One drawback of optical fibers is that they exhibt a relatively high attenuation. According to a known proposal, disclosed in German Pat. No. 1,254,513, however, a data transmission system using optical fibers operates well when the required intermediate amplifiers are made of semi-conductor elements. The maximum permissable distance between the intermediate amplifiers has been found by experience to be approximately 100 meters. Since, in the above-mentioned system, the intermediate amplifiers regenerate the data flow, such a high amplification density, i.e., short distance between amplifiers, is advantageous for the stated purpose since the physical requirement for the construction of the system assures that a sufficient number of user location connection points will be available.

Figure 4:
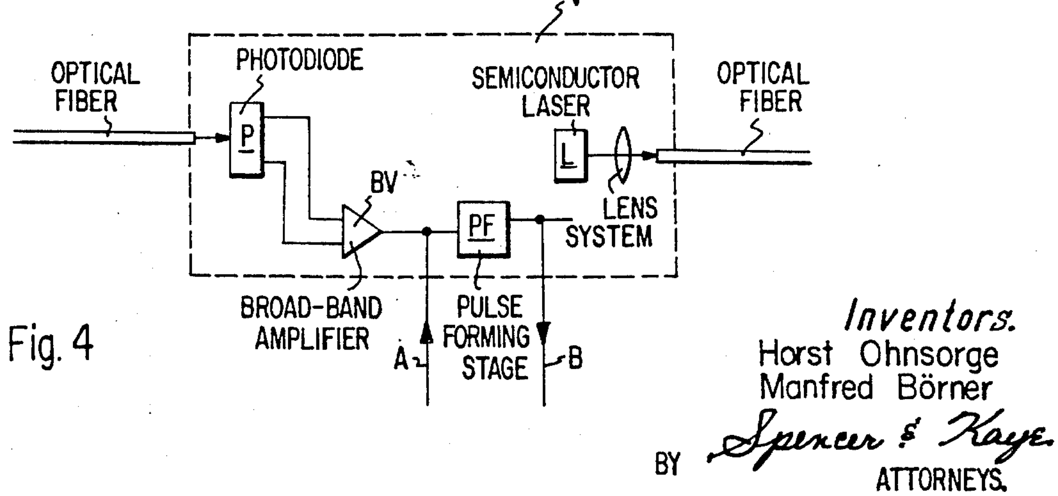
FIG. 4 is a schematic block diagram of an intermediate amplifier.
Figure 7:
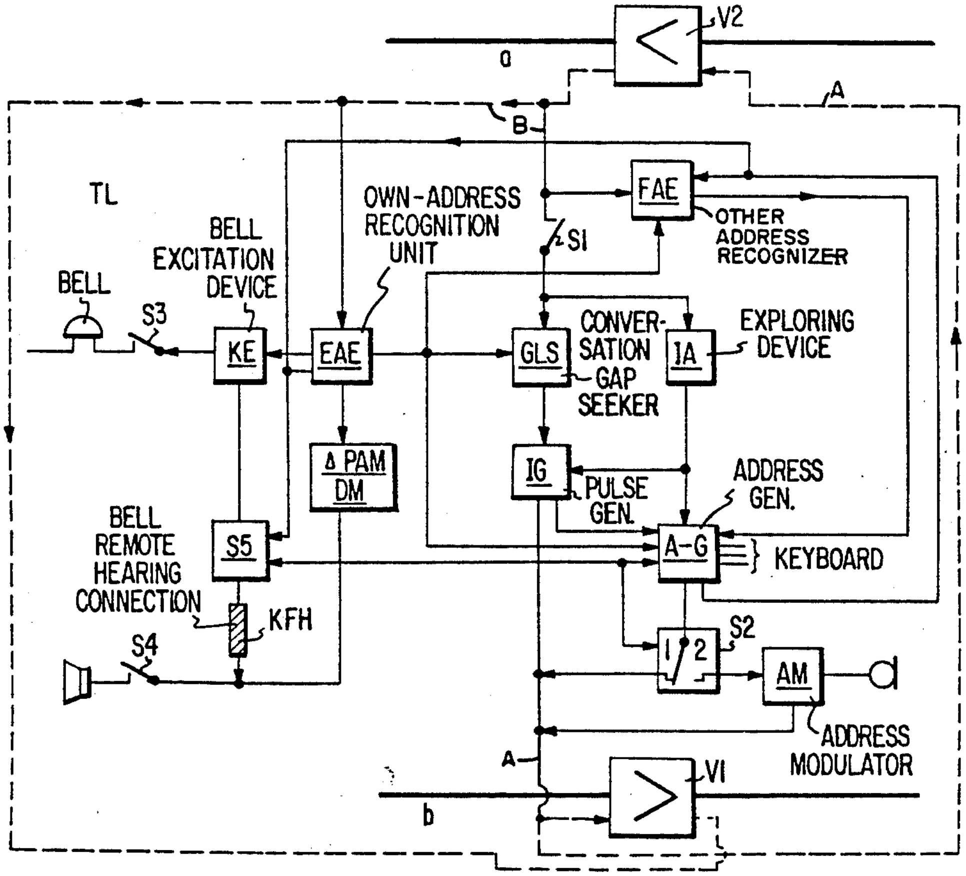
FIG. 7 shows a schematic block diagram of a user location for use in the embodiments of FIGS. 1 and 2.

The amplifiers V include firstly photo-electric converters, that is photo-diodes, which convert the modulated light beams into electric voltages which are then, amplified to the requisite level by means of a broadband amplifier. FIG. 4 shows such an arrangement with a photo-diode P and a broadband amplifier BV. After the broadband amplifier BV there is connected a pulse-forming stage PF, which in turn actuates a semiconductor laser L. The output rays of the laser L are coupled, through the diagrammatically indicated lens system, to an outgoing glass fiber line. This embodiment corresponds to the proposal of German Pat. No. 1,254,513. In FIG. 4 it is further indicated how the lines A and B, which are also designated in FIG. 7, are to be connected in order to make possible a connection of the user location.

Frequency multiplexing and time multiplexing were already mentioned above as the suitable transmission methods.

It is also possible, in an advantageous manner, to employ special time function multiplex methods such as those already known, for example, as "Radas" (Random Access Discrete Address System), "SSMA" (spread spectrum multiple access) or "Walsh multiple" (orthogonal functions).

In a "Radas," the recognition of the individual messages is accomplished by associating a short address in the form of a binary sequence with each user location, the number of user locations being restricted so that error probability remains small. The binary sequence for the receiving user location is modulated by the information to be transmitted, e.g., according to a $\Delta$-modulation or a pulse amplitude modulation.

The information associated with each user location is determined from the identifying characteristics in that each user location produces a cross correlation of its address with the total information of the data transmission system and determines the information destined for it as the autocorrelation from the signal mixture.

In an "SSMA" system, however, relatively long addresses in the form of binary sequences are selected. When the addresses overlap, correlation reception assures sufficient interference spacing.

In summary, a telephone system constructed according to the present invention operates in such a manner that each user location monitors the total flow of data. If it detects information directed to it, this is selected from the data flow, if necessary after previously operating a bell.

If the user at a particular location desires to transmit information, this can always being be done unless the transmission capacity is already fully utilized by the other user locations.

As power supply for the amplifiers and user location circuits, the present invention provides that in addition to the actual data channel — the optical fiber line — a wire cable C is installed parallel thereto, as shown in FIG. 1 which can additionally be utilized to transmit service signals.

An example for the circuit of a user location will be described hereinafter, a modified "Radas" method being used in this further development of the invention.

The modification lies in that, in place of a completely asynchronous data transmission, each user location uses the transmission medium only at those times when other user locations are not using the transmission medium.

Thus, use is made partially of features of the "Radas" method, partially of features of the conventional time-multiplex method. In contrast to the known time-multiplex method however there is no fixed time frame and therefore also there are no synchro-signals. Each user location can occupy as much free transmission time as desired on the time axis of the common transmission medium. The provision for synchronization on the side of the calling user location is limited to ascertaining the times not otherwise occupied. On the side of the called user location, synchronization is effected with the aid of a correlator, a particularly simple solution corresponding to the "Radas" method.

It is quite possible to provide a separate outward path and a separate return path for each channel; on the other hand the time-multiplex principle renders possible the exploitation of one single transmission medium for both outward and return paths, separate times being allocated to the different directions.

In order to simplify the description, it will be assumed that one transmission path is available for each of the two directions. By "channel" is to be understood such a data-transmission medium, perhaps in the form of a pair of conductors.

Figure 5:
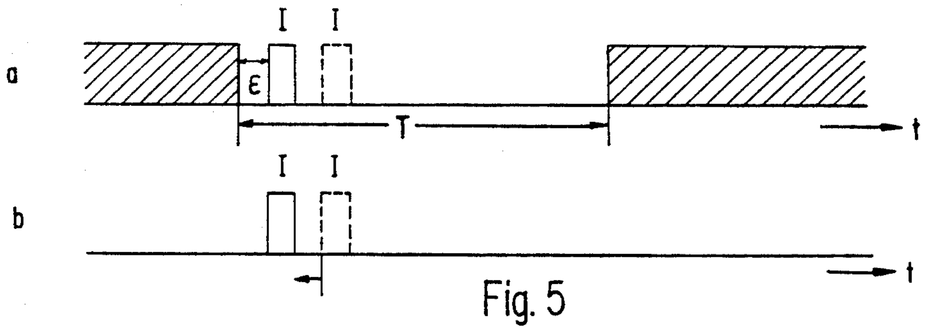
FIG. 5 shows the flow of information on both transmission paths of the embodiments of FIGS. 1 and 2.

FIG. 5 shows the flow of information on both transmission paths *a* and *b*, being respectively the return and the outward paths.

The user location monitors the flow of data on path *a* until it finds a time gap T, that is a time interval which is not occupied by other user locations. It begins to send out a pulse sequence I on path *b* (outline drawn in chain lines). This pulse sequence I is now shifted in phase until it is ascertained, by reference to the examination of the transmission path *a*, that it lies at the beginning of the time interval, except for a gap $\epsilon$ (outline drawn in solid lines).

The length of the pulse sequence I is expediently so selected that it corresponds to two addresses.

When the pulse sequence I has reached its final position, it is not transmitted any more. In its place the calling user location transmits the address of the called user location (stranger-address) and thereafter its address (own-address), the transmission of these two addresses taking place with the phase and the timing of the pulse sequence I, namely in rigid place relation to the beginning of the time interval.

The called user location ascertains, in monitoring the flow of data, that its address is being transmitted. This can be ascertained by mask exploration or by the described correlation. The address recognition leads, at the called user location, to the tripping of a signal, for example the usual bell. It is advantageous to cause the ringing only when at least *j* address repetitions have been received.

The calling user location likewise monitors the channel and ascertains that own-address is present therein (for he has transmitted it himself). Now this own-address is used to allow the bell to be heard by the calling user, that is he hears a simulation of the ringing at the called user's end.

If the called user accepts the connection, the exploration of the address can thereafter take place in synchronism, that is the called user location no longer monitors the entire flow of data, but only those intervals within the time frame in which the information for the connection just made is transmitted. In this way a further user location is prevented from connecting itself into the connection then just made.

The lifting of the receiver by the called user cuts off the bell at his end.

Figure 6:
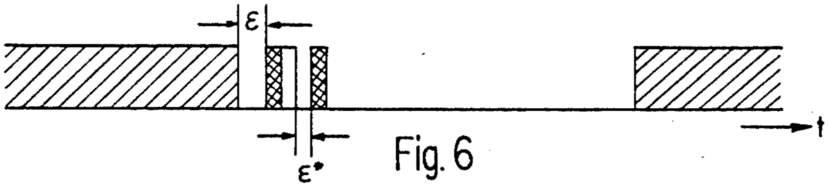
FIG. 6 shows the flow of information after connection has been made.

After the connection has been made, the called user location for its part transmits the address of the calling user location. FIG. 6 shows that the latter is timed relative to the address transmission by the calling user location so that the address transmission of the called user location is shifted to within a time interval $\epsilon^*$ of the address transmission of the calling user location (cross-hatched: address of the calling user location; not hatched: address of the called user location). The phase shift necessary for this is produced as described in connection with the building up of the connection.

Now the calling user location receives its address twice per time interval, once as transmitted by itself and once as sent back by the called user location. This double address reception cancels its bell reception and terminates the transmission of its own-address.

Now both user locations can use the addresses transmitted by them as carrier of information, the addresses being modulated for example by 180° phase reversal, corresponding to the information values 0 or 1.

The question of the "engaged" signal can be solved relatively simply if each user location, before making a connection, examines the entire flow of data to see whether the address of the user location to be called is already contained therein, which indicates the existence of another connection. If it is, its discovery can be used as criterion for tripping the engaged, or "busy," signal at the caller's end.

Another possibility for indicating the "engaged" condition consists in that after the bell has been heard for a certain pre-determined time at the calling user's end, the engaged signal is given automatically.

FIG. 7 shows the block circuit diagram of one of the user locations TL, the additional user locations being substantially identically constructed. Starting from the intermediate amplifiers V1 and V2 in the transmission paths *a* and *b*, the channel is constantly monitored, by means of an own-address recognition unit EAE, as to whether a call occurs. An incoming call, as stated above, has the form of an unmodulated address. Such a call, on arrival in a bell excitation device KE, is converted into bell current. On lifting the receiver, switches S1 and S4 are closed, a switch S3 is opened and a switch S2 is brought into the position 2. By closing the switch S1, a conversation-gap seeker GLS is switched on, the operation of which is initially so controlled by recognition of its own address that the time interval is found after the caller's location address.

A pulse generator IG for the pulse sequence I transmits this pulse sequence I and regulates its phase until an exploring device IA recognizes the beginning of the pulse sequence I at the desired point on the time axis, namely at the interval $\epsilon$ * after the caller location's own-address. The sending of this pulse sequence I is now terminated. On lifting of the receiver the stranger-address stored in a stranger-address recognizer FAE is passed into an address generator AG, which is controlled by the keyboard when acting as calling user location. The stranger-address is now given by the address generator AG through the switch S2 to an address modulator AM, in which it is modulated for example in amplitude, by the speech signals, and then passes through the intermediate amplifier V1 into the telephone network. The conversation-gap seeker GLS ensures that during the conversation the total time between the time interval edge, the address of the caller and the address of the called user, remains in the magnitude $\epsilon + \epsilon$ *. The value $\epsilon$ is expediently so selected that it corresponds to the length of an address.

In operation as calling user location, the operation is as follows:

Removal of the receiver closes the switches S1 and S4, opens the switch S3 and places the switch S2 into position 1. The conversation-gap seeker GLS seeks a conversation gap, the pulse generator IG is started and the pulse sequence I emitted by it is shifted in phase, as described. As soon as it has reached its final position, the sequence is no longer emitted; The pulse generator IG passes the correctly phased timing pulse into the address generator AG.

Now the stranger-address is introduced into the keyboard of the address generator AG. In the same way introduction by dial is possible. A return line ensures that no interference is caused by the stranger-address recognition.

The own-address, which is sent after the stranger-address, until the called user accepts the connection, gives signals through the own-address recognition unit FAE to the bell excitation KE, which operates the remote bell hearing, through the bell remote hearing connection KFH, in the receiver. If the own-address is received twice per time interval, then a switch S5 is opened. The conversation can begin. The lifting of the receiver to establish connection with another location acts to close the switch S5.

A demodulator ΔPAM DM is coupled between the own-address recognition unit EAE and the switch S4 for demodulating the signals which are received from the amplifier V2, the resulting demodulated signals being fed as an analog signal, e.g., containing speech information, to a utilization device via the switch S4.

An additional connection is shown in FIG. 7 in dashed lines, which connection becomes necessary when only one transmission line *a* is provided.

The own-address recognition unit EAE, which simply serves to recognize the address which was previously assigned to the user location in which that unit is disposed, is constructed quite simply as a shift register through which all of the information passing through the transmission medium is fed in serial form and which contains a number of bit locations equal to the number of bits in the address of the associated user location. The individual register stages are connected with selected inputs of an AND gate in a straightforward manner so as to cause that gate to emit a pulse signal only when the address of that user location is present in the shift register.

Figure 8:
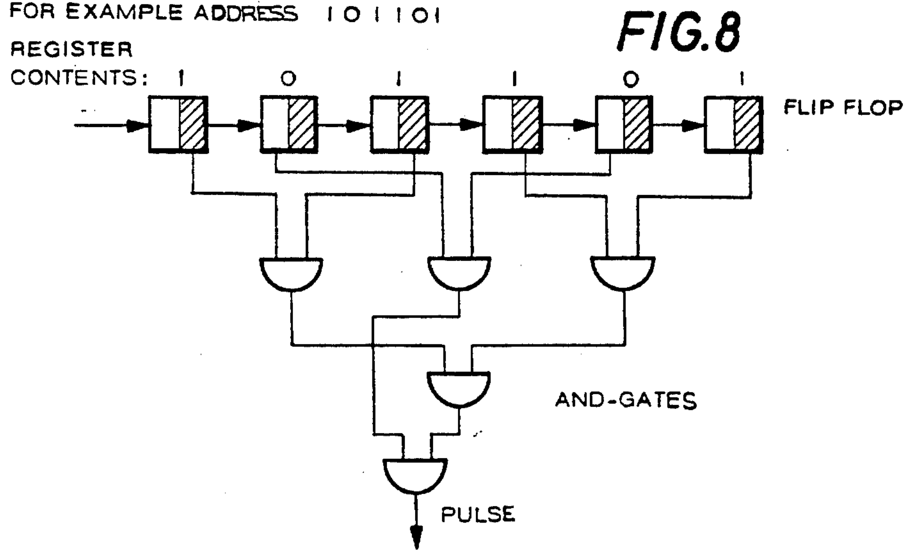
FIG. 8 shows a schematic block diagram of an own-address recognition unit EAE for use in an embodiment according to the invention.

An example of an own-address recognition unit EAE in detail is shown in block diagram of FIG. 8. The unit EAE consists of a shift register the outputs of which are conected with a combination of AND gates. This unit delivers a pulse as soon as the binary pattern of the own address appears in the shift register, in case of FIG. 8 the address being 1 0 1 1 0 1. The shift register may consist of flip-flops as shown.

The conversation gap seeker GLS is constituted by a counter which counts pulses furnished by an associated stable pulse generator whenever a gap is present in the data flow through the transmission medium. If the count produced by such counter exceeds a predetermined value, this indicates that a gap of sufficient duration has been discovered. This counting operation is started after the switch S1 has closed and due to a pulse from the own-address recognition unit EAE indicating that such unit has just recognized the appearance of its own-address. Thus, the next gap of sufficient length following the occurrence of its own-address is recognized by the conversation gap seeker GLS.

Figure 9:
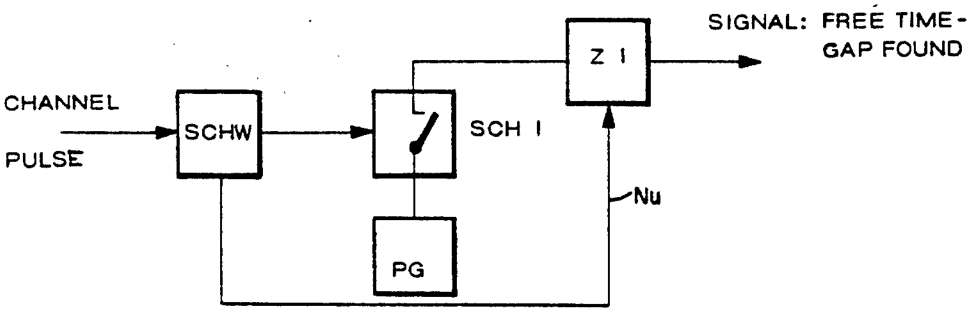
FIG. 9 shows an example of a conversation gap seeker unit GLS for use in an embodiment according to the invention.

FIG. 9 shows an example of a conversation gap seeker GLS consisting of a threshold value circuit Schw which connects a pulse generator PG by means of a switch Sch 1 with a binary counter Z 1, whenever no pulse voltage is delivered from the transmission frequency channel to the input of the switch Sch 1. The binary counter counts the pulses delivered from the pulse generator PG till the next pulse voltage appears at the threshold value circuit Schw. This pulse voltage causes an interruption of the delivery of pulses from the pulse generator PG, via switch Sch 1, to the binary counter Z 1. Simultaneously the counter Z 1 is reset to position zero by the threshold value circuit Schw via the connection line Nu. If the conversation gap is sufficiently large (that is if the time interval during which no pulses are delivered by the transmission frequency channel to the threshold value circuit Schw is sufficiently large) then in the counter Z 1 a predetermined value is reached and the counter Z 1 delivers an output signal which has the meaning "conversation gap found." This may be accomplished for example in that the counter delivers the output signal only when the last binary stage of the counter changes its state for the first time.

The pulse generator IG is a simple feedback connected shift register into which the pulse sequence I (see FIG. 5) are fed and stored by known circuit means. The output of this shift register is connected to the input thereof and also to the amplifier V1. A pulse generating unit within the pulse generator IG cycles the data through the shift register.

Figure 10:
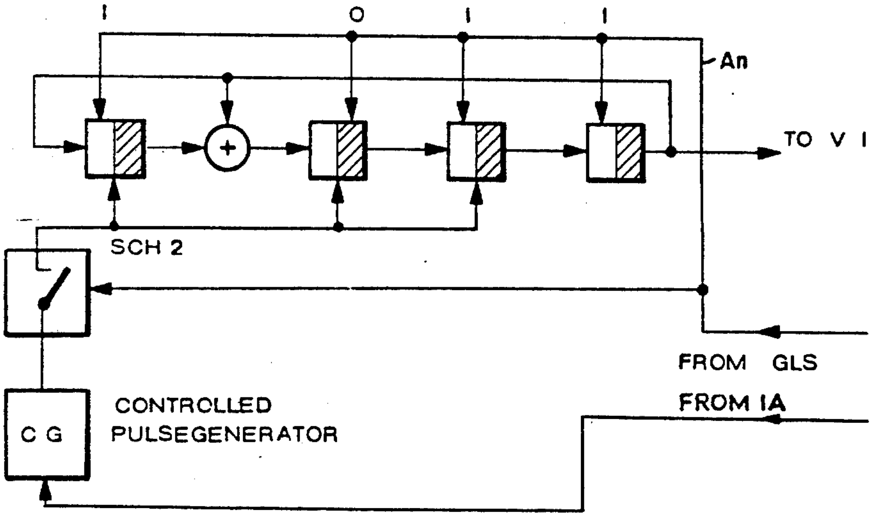
FIG. 10 shows an example of a pulse generator IG for use in an embodiment according to the invention.

FIG. 10 shows an exemplary block diagram of a pulse generator IG used. The pulse generator IG may consist of a feedback shift register. (A similar shift register is for example described by Peterson, "Error Correcting Codes," MIT Press 1961, pages 109 cont'd.) This shift register is set into its initial state by the output signal of the conversation gap seeker GLS at the beginning via the connection line An. Simultaneously the output signal of the conversation gap seeker GLS causes the controlled pulse generator CG to be connected with the shift register by means of the switch Sch 2. Thus the shift register is operated pulsewise and delivers a pulse sequence to V 1.

The exploring device IA, which has a structure similar to that of own-address recognition unit EAE, also recognizes the pulse sequence I which reaches it from the amplifier V2. The exploring device IA includes a time measuring device which is constructed simply as a counter and which measures the time between the beginning of a conversation gap, when the location in question calls another location, or the end of the received own-address, when the location in question is being called, and the time when the exploring device IA recognizes the pulse sequence I. Alternatively, the exploring device IA may be constructed as an integrating circuit. If the duration of this gap is shorter than $\epsilon$ or $\epsilon^*$, which is determined by a threshold value circuit forming part of the exploring device IA, the pulse sequence I is delayed in the pulse generator IG by acting on its associated pulse generating unit. If the duration is longer than $\epsilon$ or $\epsilon^*$, the pulse sequence I is advanced in its time, or phase, position, so that the correct time relation is produced between a pulse I and the beginning of the gap or the end of the own-address. If the threshold value circuit determines that the time interval $\epsilon$ or $\epsilon^*$ has been reached it turns pulse generator IG off via a switch.

Figure 11:
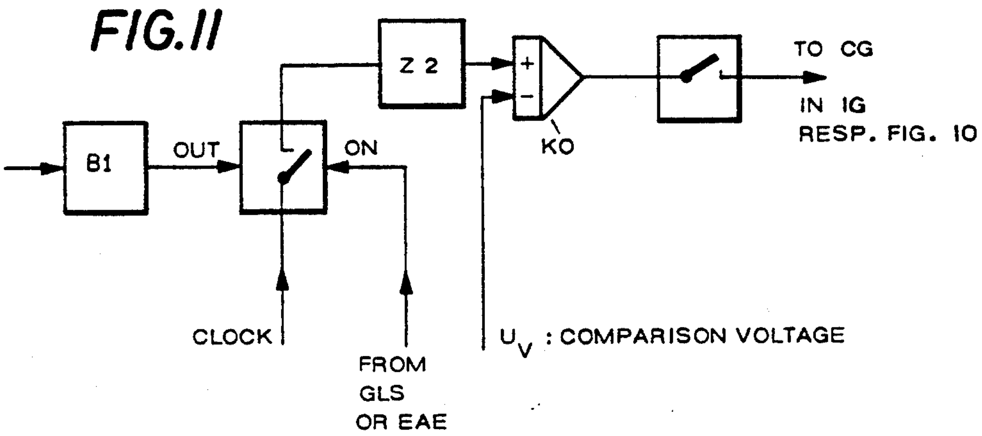
FIG. 11 shows a schematic block diagram of an exploring device IA for use in an embodiment according to the invention.

FIG. 11 shows a block diagram of an exploring device IA as used for example. The device IA is switched on by the conversation gap seeker GLS when the location in question is calling or is being called when the telephone receiver is lifted. A device B 1 similar to the device EAE in FIG. 8 recognizes the sequence I (or the stranger address) and stops a counter Z 2, which had been started counting, by the signal delivered from the conversation gap seeker GLS (or by a signal delivered from the own address recognition unit). If the counting value is unequal to $\epsilon$ (or $\epsilon^*$), a voltage is applied from a comparator Ko to the pulse generator CG in the exploring device IA or a circuit according to FIG. 10, respectively, thereby accelerating or delaying the pulse generator CG till the counting value of the counter Z 2 is equal to the desired $\epsilon$ or $\epsilon^*$. Comparator Ko is an analogue adding device which is commercially available. The counting value of the counter Z 2 is delivered to the comparator Ko in the form of an analogue voltage in a manner which is well known in the art.

The stranger-address recognizer FAE is constructed in a simple manner as a shift register whose operation is controlled by the own-address recognition unit EAE in such a manner that it stores the data coming from the amplifier V2 as soon as the own-address recognition unit EAE has just recognized the address assigned to the associated location. Since the stranger-address immediately follows the own-address (see FIG. 6), it is stored in the stranger-address recognizer FAE.

The stranger-address recognizer FAE consists essentially of a store, which is well known in the art and which picks up the stranger address. It may be in form of a shift register or any other known store, so that it is not necessary to show it in a diagram.

The address generator AG is constructed as a feedback connected shift register which is set by the stranger-address recognizer FAE, when the location in question is being called, or by the associated keyboard, when the location in question is the calling party. In the latter case, the keyboard is operated by the calling party in accordance with the address of the party being called and this latter address is then generated in the address generator AG in accordance with the combination punched into the keyboard.

Figure 12:
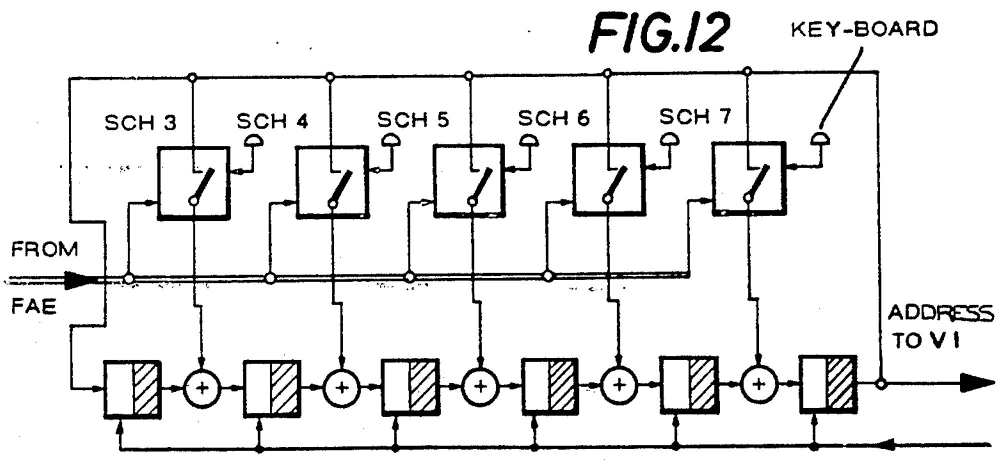
FIG. 12 shows a schematic block diagram of an address generator AG for use in an embodiment according to the invention.

An example of a detailed block diagram of an address generator AG is shown in FIG. 12. As an address generator a feed-back shift register may be used, the feedback lines of which are switches Sch 3 . . . Sch 7. A shift register which may be used is for example described by Peterson "Error Correcting Codes," MIT Press 1961, page 109, FIGS. 7, 3. In case the location (station) in question operates as a called party by the stranger-address recognizer a switch combination is set, which causes the generation of the stranger-address as soon as the shift register receives shift pulses. In FIG. 12 the shift pulse connection is not shown for sake of simplification. When starting a connection the shift register is set into the start position by means of the start connection, for example all the flip-flops may be set into the position "1." In case the location in question operates as a calling party, the setting of the switch combination Sch 3 . . . Sch 7 is caused by the keyboard or the dial of the telephone apparatus.

The address modulator AM is, when each user location is in the form of a telephone, constituted by an analog-digital converter which receives a voice frequency signal from the telephone speaker microphone, indicated schematically in FIG. 7, and converts this into a digital signal, and by a digital modulation unit, for example a pulse code modulation unit, which modulates the address sent to the modulator in accordance with the digital representation of the voice frenquency signal. It should here again be recalled that systems of the type with which the invention is concerned operate at a relatively high repetition rate wherein successive pulses from any given location occur with sufficient frequency to permit their individual pulses to be reconstructed into a voice frequency signal at the receiving end. One type of modulation which could be employed, would be a simple binary modulation wherein the polarity of the bits during each occurrence of the address signal is given one value or the other depending on whether the digital representation of voice frequency signal has, at that moment, a binary value of "1" or "0." Since, when the transmission medium is in the form of an optical fiber line, the type of modulation is preferably an off-on keying, the negative binary value ("0") signifies that a pulse is not sent for each positive address bit, but a pulse is sent for each location in the original address where there was not a pulse.

The remote hearing connection KFH is a simple element for coupling in the bell current to enable the calling party to hear a reproduction of the bell ring at the location of the called party. The element can be a simple conductive, inductive or capacitive feed to the ear piece of the instrument at the location in question.

The switch S5 is constructed in a simple manner. When the own-address of the location in question is received, this address actuates a counter forming part of the switch S5 which automatically resets itself to zero after a duration equal to two address word lengths. If during this time interval, the own-address of the location in question is received twice (which occurs in the situation illustrated in FIG. 6), then this counter reaches a value at which it can actuate a signal which causes the switch S5 to no longer transmit the bell signals coming from bell excitation device KE via the bell remote hearing connection KFH and the switch S4 to the receiver of the instrument associated with the location.

Figure 13:
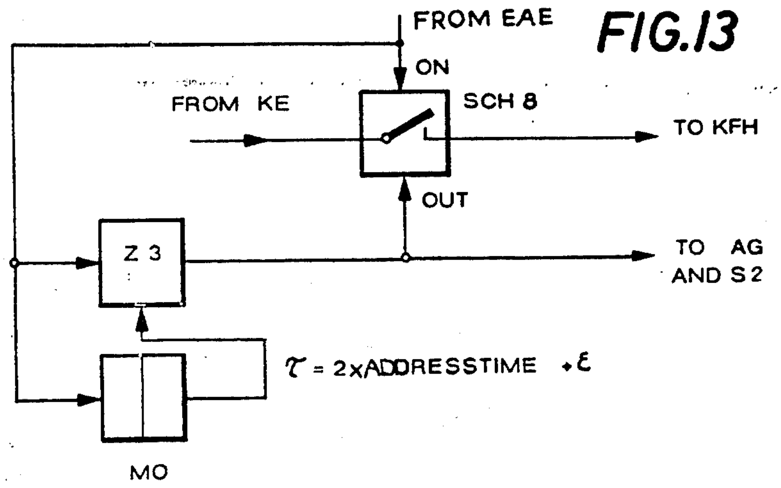
FIG. 13 shows a schematic block diagram of a switch S5 for an embodiment according to the invention.

FIG. 13 shows an example of a detailed block diagram of a switch S 5 as it may be used in an embodiment according to the invention. The switch Sch 8, which is a part of the switch S 5, is switched on by means of the recognition of the own address in the own-address recognition unit EAE thereby leading bell signals via the remote hearing connection KFH to the bell. A binary counter Z3 counts the signals from the own-address recognition unit EAE. Simultaneously the signals or pulses from the unit EAE excite a monostable multivibrator (mono-flop) MO which remains in the excited position for a definite time $\tau$ and then flops back to its stable position. The back side of the pulse of the mono-flop MO causes the counter Z 3 to be set into its zero position. The duration of the time $\tau$ is chosen so long that during that time two own-addresses following each other can be received. This case only then occurs, if the connection is made. The counter Z 3 only then reaches the counting value 2. That counting value now switches off the switch Sch 8 and simultaneously delivers the signal for beginning the conversation to the units AG and S 2.

A return line is provided in a system according to the invention in which all information is conveyed past all users via a single transmission line. However, two transmission lines *a* and *b* are shown in FIG. 7. In the case of a single line, such line has the form of a closed circle, or ring. In this case, the input from one user location would not be transmitted via amplifier V1, but rather directly from the pulse generator IG or the address modulator AM via the return line represented by the dashed line at the right-hand side of FIG. 7, so that the information would be transmitted via the amplifier V2. For such operation, however, it is necessary that each address returning to the location in question be erased and the corresponding time interval be replaced by a newly modulated address word or that at the end of a conversation this time interval be released for use for a conversation by another pair of parties. In the case of a transmission line which is not closed, and as illustrated in FIG. 7, wherein there are two transmission lines *a* and *b*, the addresses must be transmitted in both directions. In this case, the output of each amplifier V1 and V2 is connected to the input of the other amplifier.

Ring line operation could also occur by connecting the transmission lines *a* and *b* into a ring in such a manner that the ends of these lines, which in the embodiment of FIG. 1 end in the sinks 5, are connected together at their right-hand and left-hand ends, with regard to the view of FIG. 1. In this case, the dashed lines shown in FIG. 7 would not be required. It might be noted that in the embodiment of FIG. 7, the amplifier V2 serves only for receiving information from another location, whereas amplifier V1 alone functions as the transmitter of information from the associated location.

It will be understood that the above description of the present invention is susceptible to various modifications, changes and adaptations, and the same are intended to be comprehended within the meaning and range of equivalents of the appended claims.

We claim:

1. In a time multiplex multiple access data transmission system composed of a plurality of user locations connected to a common transmission medium at more than two different points thereof for transmitting messages, including address data, through such medium, and multiplex means for multiplexing the individual messages for delivery to the transmission medium, the improvement wherein: said medium comprises two transmission channels disposed parallel to one another; each channel is composed of a series of optical fiber segments and a plurality of intermediate amplifiers connecting said segments together in series and each connected to a respective user location; said amplifiers in one said channel are oriented to conduct signals in one direction while said amplifiers in the other said channel are oriented to conduct signals in the opposite direction; and each said user location has an outgoing line connected to the input of its respective amplifier in at least the one said channel and an incoming line connected to the output of its respective amplifier in at least the other said channel; and wherein said system further comprises means associated with each said location for monitoring the entire data flow through said medium and automatically selecting that data intended for said location.

2. An arrangement as defined in claim 1 wherein there are a plurality of said transmission media, and further comprising means defining a coupling point connected to both channels of each said medium for conducting all signals received from a respective channel of one said medium to those channels of the other said media which are arranged to conduct signals away from said coupling point.

3. An arrangement as defined in claim 2 wherein said transmission media are connected in the form of a star network.

4. A method for data transmission in a time multiplex multiple access data transmission system composed of a plurality of user locations connected to a common transmission medium at more than two different points thereof for transmitting messages through such medium, the method permitting data transmission between a calling user location and a called user location, said method comprising, in the framework of a telephone network without a central exchange, for each said user location, monitoring the entire flow of data for individual information intended for that user location, by reference to addresses contained in said flow of data; and for each user location, transmitting according to a "Radas" like method by monitoring the entire existing data flow and introducing data into said transmission medium only during those time intervals when other users are not using said transmission medium in place of a fully asynchronous data transmission.

5. An arrangement as defined in claim 2 further comprising a non-reflecting load connected to each free end of each said channel.

6. A method as defined in claim 4 wherein user locations participating in a connection cease monitoring the remainder of said flow of data for the duration of said connection.

7. A method as defined in claim 4 wherein the finding of each said user location of its own address within the data flow trips a ringing signal.

8. A method as defined in claim 7 wherein each said calling user location monitors said flow of data as to whether the address of a user location to be called is already being transmitted, for determining the actuation of an engaged signal at said calling user location.

9. A method as defined in claim 8 wherein each said calling user location firstly seeks out a time gap within the flow of data, and after finding such a gap sends out a pulse sequences in a predetermined time interval.

10. A method as defined in claim 9 wherein, after termination of such time gap, said pulse sequences are replaced by a pulse sequence containing in succession the address of said called user location and the address of said calling user location, these said addresses being sent in rigid phase and frequency relation to said time gap.

11. A method as defined in claim 2 wherein the sending of said address of the calling user location is used as criterion for the actuation of a ringing tone.

12. A method as defined in claim 9 wherein, when a connection is made, said called user location transmits the address of said calling user location away so that it is situated at a predetermined time interval from the address of said calling user location transmitted by said calling user location.

13. A method as defined in claim 12, wherein reception by said calling user location of the address of said calling user location transmitted by said called user location terminates the ringing tone, after a predetermined number of repetitions.

14. A method as defined in claim 13 wherein when a connection has been made, transmitted addresses are modulated with the data to be transmitted so that information for the called user location is contained in the time gap.

15. A method as defined in claim 4 wherein a light-conductor line is used as said transmission medium.

* * * * *

UNITED STATES PATENT OFFICE
CERTIFICATE OF CORRECTION

Patent No. 3,803,405 Dated April 9th, 1974

Inventor(s) Horst Ohnsorge and Manfred Börner

It is certified that error appears in the above-identified patent and that said Letters Patent are hereby corrected as shown below:

In the heading of the patent, line 2, change "Mandred" to --Manfred--; line 7, change "Ulm, Germany" to --Ulm/Danube, Germany--; line 11, change "Oct. 8" to --Oct. 9--. Column 1, line 4, change "Oct. 8" to --Oct. 9--. Column 4, line 13, change "exhibt" to --exhibit--. Column 5, line 12, delete "being"; line 13, after "already" insert --being--. Column 6, line 7, change "place" to --phase--. Column 8, line 21, change "conected" to --connected--. Column 13, line 19, before "pulse" delete "a".

Signed and sealed this 10th day of June 1975.

(SEAL)
Attest:

RUTH C. MASON
Attesting Officer

C. MARSHALL DANN
Commissioner of Patents
and Trademarks